United States Patent
Wang et al.

(10) Patent No.: US 8,749,997 B2
(45) Date of Patent: Jun. 10, 2014

(54) PEAK CURRENT CONTROL CIRCUIT FOR SWITCHING MODE POWER SUPPLY AND METHOD THEREOF

(75) Inventors: Siran Wang, Hangzhou (CN); Yuancheng Ren, Hangzhou (CN); Junming Zhang, Hangzhou (CN); En Li, Hangzhou (CN)

(73) Assignee: Chengdu Monolithic Power Systems Co., Ltd., Chengdu (CN)

(*) Notice: Subject to any disclaimer, the term of this patent is extended or adjusted under 35 U.S.C. 154(b) by 280 days.

(21) Appl. No.: 13/288,536

(22) Filed: Nov. 3, 2011

(65) Prior Publication Data

US 2012/0112795 A1 May 10, 2012

(30) Foreign Application Priority Data

Nov. 4, 2010 (CN) .......................... 2010 1 0538121

(51) Int. Cl.
*H02M 3/335* (2006.01)

(52) U.S. Cl.
USPC ........................................................ 363/21.12

(58) Field of Classification Search
USPC ................. 363/21.12, 21.18, 79–80; 323/284
See application file for complete search history.

(56) References Cited

U.S. PATENT DOCUMENTS

| 7,639,517 B2 * | 12/2009 | Zhou et al. ................. 363/21.17 |
| 2009/0284180 A1 * | 11/2009 | Shen et al. .................... 315/307 |
| 2010/0124080 A1 * | 5/2010 | Yeh et al. ................... 363/21.12 |

* cited by examiner

*Primary Examiner* — Harry Behm
(74) *Attorney, Agent, or Firm* — Perkins Coie LLP

(57) ABSTRACT

A switching mode power supply with improved peak current control is disclosed. A varying reference signal is adopted to limit the peak current in the energy storage component. The varying reference signal is an exponential function of a time period when a power switch is ON, wherein the power switch is coupled to the energy storage component. The varying reference signal may be generated by a circuit comprising a RC circuit and one or several voltage sources.

17 Claims, 6 Drawing Sheets

PEAK CURRENT CONTROL CIRCUIT FOR SWITCHING MODE POWER SUPPLY AND METHOD THEREOF

CROSS-REFERENCE TO RELATED APPLICATION(S)

This application claims priority to and the benefit of Chinese Patent Application No. 201010538121.3, filed Nov. 4, 2010, which is incorporated herein by reference in its entirety.

TECHNICAL FIELD

The present disclosure relates generally to electrical circuits, and more particularly but not exclusively to switching mode power supplies.

BACKGROUND

There are many control methods for controlling an output current in a switching mode power supply (SMPS). One control method is a peak current control. FIG. 1A schematically shows a switching mode power supply with a controller AP3708 (Preliminary Datasheet, Rev.1.0, 2008.09, http://www.bcdsemi.com). The controller AP3708 is a primary side controller provided by BCD Semiconductor.

In FIG. 1A, an input signal $V_{IN}$ is applied to a first terminal of a primary winding $N_P$. A second terminal of the primary winding $N_P$ is coupled to a transistor Q1, which is controlled to be turned ON and OFF by the controller AP3708. When the transistor Q1 is turned ON, a primary current $I_P$ flows through the primary winding $N_P$, which starts building up a magnetic energy. A secondary winding Ns is magnetically coupled to the primary winding $N_P$ and includes a secondary diode D1 and a capacitor Co, which has a relatively high capacity to stabilize the variation of a voltage Vo supplying to a load. The polarity (winding sense) of the secondary winding Ns is configured such that the magnetic field produced by the primary current $I_P$ (when the transistor Q1 is turned ON) induces a voltage that reverse biases the secondary diode D1; and when the transistor Q1 is turned OFF, the sign of the time derivative of the magnetic field is reversed and a current $I_S$ is induced in the secondary winding Ns. A part of the current $I_S$ charges the capacitor Co and the rest supplied to the load Ro. The capacitor Co maintains an output current Io flowing to the load by partly discharging while the secondary current $I_S$ stops flowing. This is the case when the energy in the magnetic field has been completely discharged.

FIG. 1B shows a prior art peak current control circuit which could be applied in the controller AP3708 or other switching mode power supplies. At the beginning of the switching cycle of the power supply, the transistor Q1 is turned ON, and the primary current $I_P$ flowing through the transistor Q1 increases, which causes a voltage $V_{CS}$ across a current sensing resistor $R_{CS}$ to increase. When the voltage $V_{CS}$ reaches a reference signal $V_{limit}$ (for example, 0.5V), a comparator 101 provides a comparison signal Comp to a logic circuit 102. Then the logic circuit 102 provides a signal Gate at a pin OUT to turn OFF the transistor Q1, so as to stop the increasing of the primary current $I_P$. The time period when the transistor Q1 is turned ON is defined as an ON time $t_{onp}$. The relationship between the reference signal $V_{limit}$ and the ON time $t_{onp}$ could be expressed as:

$$V_{limit} = \frac{VIN}{L_m} \times t_{onp} \times R_{CS} \quad (1)$$

wherein $L_m$ represents the inductance of the primary winding $N_P$.

In real world application, when the voltage $V_{CS}$ reaches the reference signal, the transistor Q1 will be turned OFF after a propagation delay. This propagation delay is defined as a shut down delay $t_d$. The shut down delay $t_d$ is usually a fixed value in a given system. Because of the shut down delay $t_d$, the transistor Q1 will not be turned OFF immediately when the voltage $V_{CS}$ reaches the reference signal $V_{limit}$.

The value of the voltage $V_{CS}$ is a production of the primary current $I_P$ and the resistance of the current sensing resistor $R_{CS}$. In a given system, the current sensing resistor $R_{CS}$ is constant, which means that the waveform of the primary current $I_P$ is similar to the waveform of the voltage $V_{CS}$ despite of their magnitude. FIG. 2 shows waveforms of the voltage $V_{CS}$ under different conditions. Waveform $V_{CS1}$ has an input signal $V_{IN1}$. Waveform $V_{CS2}$ has an input signal $V_{IN2}$. Persons of ordinary skill in the art should know that waveform $V_{CS1}$ has a slope of $V_{limit} \times R_{CS}/L_{m1}$, and waveform $V_{CS2}$ has a slope of $V_{IN2} \times R_{CS}/L_{m2}$. As seen from FIG. 2, because of different slopes, the error $\Delta V_{CS1}$ and $\Delta V_{CS2}$ caused by the shut down delay $t_d$ are different. Considering the shut down delay $t_d$, a peak current $I_{PK}$ in the primary winding $N_P$ could be written as:

$$I_{PK} = \frac{V_{IN}}{L_m}(t_{onp} + t_d) \quad (2)$$

Substitution of Eq. (1) into Eq. (2) and solution for the input signal $V_{IN}$ yields:

$$I_{PK} = \frac{V_{IN}}{L_m}(t_{onp} + t_d) = \frac{V_{limit}}{t_{onp} \times R_{CS}}(t_{onp} + t_d) = \frac{V_{limit}}{R_{CS}} + \frac{V_{limit}}{t_{onp} \times R_{CS}} \times t_d \quad (3)$$

Wherein $$\frac{V_{limit}}{t_{onp} \times R_{CS}} \times t_d$$

is the error in the peak current $I_{PK}$ caused by the shut down delay $t_d$. From Eq. (2) and Eq. (3), we could find that, even though with a same reference signal $V_{limit}$ and a same shut down delay $t_d$, the error of the peak current $I_{PK}$ could vary when the input signal $V_{IN}$ or the inductance Lm of the primary winding changes. The errors in the voltage $V_{CS}$ and the peak current $I_{PK}$ caused by the shut down delay $t_d$ introduce inaccuracy into the output current Io.

The present disclosure provides an improved peak current control circuit for the switching mode power supply and the method thereof to eliminate the error in the peak current caused by the shut down delay.

SUMMARY

It is an object of the present disclosure to provide an improved peak current control circuit for the switching mode power supply and the method thereof.

In accomplishing the above and other objects, there has been provided, in accordance with an embodiment of the present disclosure, a switching mode power supply, comprising: a power switch configured to be turned ON and OFF under the control of a switching control signal; an energy storage component configured to store energy when the power switch is turned ON, and to release the stored energy when the power switch is turned OFF; a current sense circuit configured to sense a current flowing through the energy storage component, and wherein based on sensing the current flowing through the energy storage component, the current sense circuit generates a current sense signal; a reference signal generator having an input terminal and an output terminal, wherein the input terminal is configured to receive the switching control signal, and wherein based on the switching control signal, the reference signal generator generates a reference signal at the output terminal; and a comparator having a first input terminal, a second input terminal and an output terminal, wherein the first input terminal is coupled to the output terminal of the reference signal generator to receive the reference signal, the second input terminal is coupled to the current sense circuit to receive the current sense signal, and wherein based on the reference signal and the current sense signal, the comparator generates a comparison signal at the output terminal.

In accomplishing the above and other objects, there has been provided, in accordance with another embodiment of the present disclosure, a switching mode power supply, comprising: a transformer having a primary winding and a secondary winding, wherein the primary winding has a first terminal and a second terminal, wherein the first terminal is configured to receive an input voltage, and the secondary winding is configured to supply power to a load; a power switch coupled to the second terminal of the primary winding to control a current flowing through the primary winding, wherein the power switch is controlled by a switching control signal; a current sense circuit configured to sense the current flowing through the primary winding to generate a current sense signal; a reference signal generator configured to receive the switching control signal to generate a reference signal based on thereupon; a comparator having a first input terminal, a second input terminal and an output terminal, wherein the first input terminal is coupled to the output terminal of the reference signal generator to receive the reference signal, the second input terminal is coupled to the current sense circuit to receive the current sense signal, and wherein based on the reference signal and the current sense signal, the comparator generates a comparison signal at the output terminal; and a logic circuit coupled to the output terminal of the comparator to receive the comparison signal, and based on the comparison signal, the logic circuit generates the switching control signal.

Furthermore, there has been provided, in accordance with an embodiment of the present disclosure, a method of generating a reference signal in a switching mode power supply, the method comprising: generating a switching control signal to control the ON and OFF of a power switch in the switching mode power supply; generating a varying reference signal based on the switching control signal; and turning OFF the power switch by the switching control signal when the voltage indicative of the current in an energy storage component reaches the varying reference signal.

These and other features of the present disclosure will be readily apparent to persons of ordinary skill in the art upon reading the entirety of this disclosure, which includes the accompanying drawings and claims.

The use of the same reference label in different drawings indicates the same of like components.

DETAILED DESCRIPTION

In the present disclosure, numerous specific details are provided, such as examples of circuits, components, and methods, to provide a thorough understanding of embodiments of the disclosure. Persons of ordinary skill in the art will recognize, however, that the disclosure can be practiced without one or more of the specific details. In other instances, well-known details are not shown or described to avoid obscuring aspects of the disclosure.

A peak value K of the voltage $V_{CS}$ could be written as:

$$K = I_{pk} \times R_{CS} = V_{limit} + \frac{V_{limit}}{t_{onp}} \times t_d \quad (4)$$

As seen from Eq. (4), if the reference signal $V_{limit}$ is varying according to the ON time $t_{onp}$, the peak value K of the voltage $V_{CS}$ could be constant. Hence the peak current $I_{PK}$ of the primary current $I_P$ would be constant and the accuracy of the output current $I_O$ is improved.

In Eq. (4), solution for the reference signal $V_{limit}$ leads to:

$$V_{limit} = \frac{K \times t_{onp}}{t_{onp} + t_d} \quad (5)$$

Figure 3:
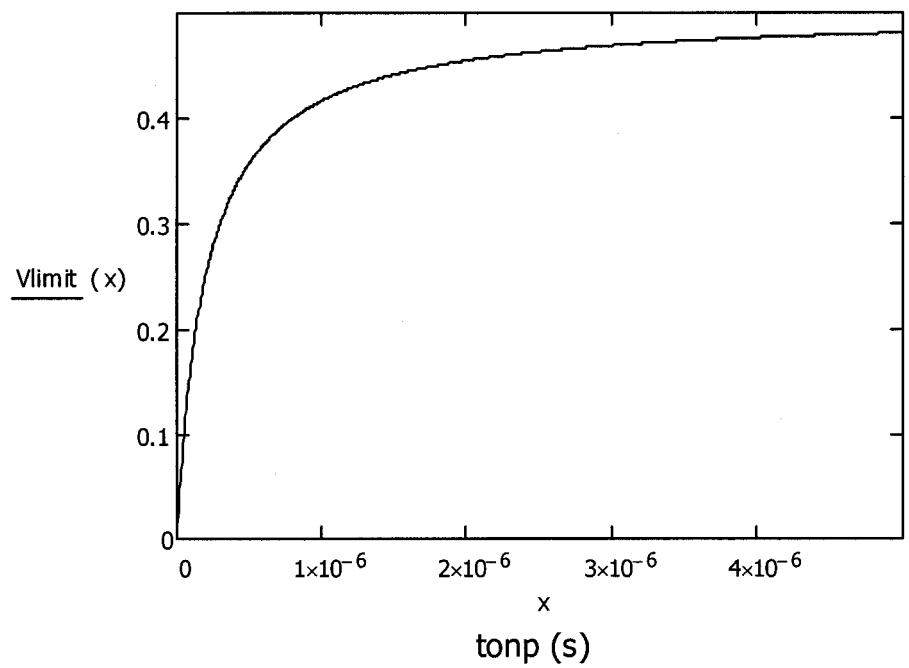
FIG. 3 shows the experimental waveform of the reference signal $V_{limit}$.

The reference signal $V_{limit}$ is plotted as the function of the on time $t_{onp}$ in FIG. 3. The reference signal $V_{limit}$ is a hyperbolic function of the ON time $t_{onp}$, which is hard to be realized by circuits. An exponential curve is similar to the hyperbolic curve and is easier to realize in application. An approximate expression of the reference signal $V_{limit}$ could be written as:

$$V_{limit} = \frac{K \times t_{onp}}{t_{onp} + t_d} \approx U_0 + U_1 \times \left(1 - e^{-\frac{t_{onp}}{R_1 C_1}}\right) + \quad (6)$$

$$U_2 \times \left(1 - e^{-\frac{t_{onp}}{R_2 C_2}}\right) + \ldots + U_n \times \left(1 - e^{-\frac{t_{onp}}{R_n C_n}}\right)$$

Wherein in the equation, $U_0$ is a DC component, $$U_i \times \left(1 - e^{-\frac{t_{onp}}{R_i C_i}}\right)$$

is an AC component which may be realized by a voltage source $U_i$ and a RC circuit comprising a resistor $R_i$ and a capacitor $C_i$, wherein $1 \leq i \leq n$ and n is a natural number.

For simplicity, Eq. (6) could be written as:

$$V_{limit} = \frac{K \times t_{onp}}{t_{onp} + t_d} \approx U_0 + U_1 \times \left(1 - e^{-\frac{t_{onp}}{R_1 C_1}}\right) \quad (7)$$

Persons of ordinary skill in the art should know that the exponential curve may be more similar to the hyperbolic curve if there are more accurate AC components in the exponential function. In the application where high accuracy is needed, the hyperbolic curve may be fitted by an exponential curve with several AC components.

Figure 4:
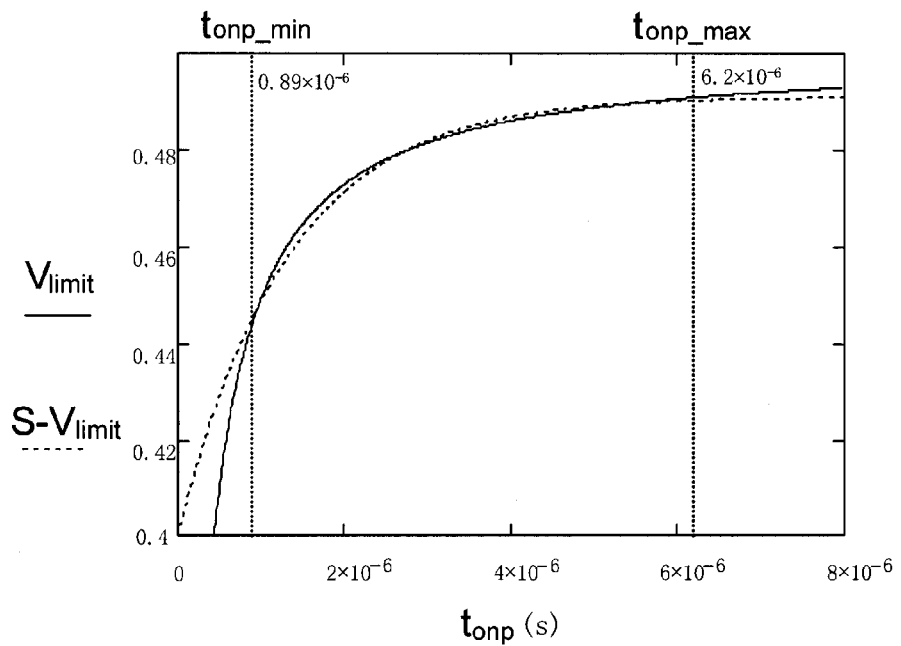
FIG. 4 shows the experimental waveform in FIG. 3 and an exponential curve fitted to it.

The reference signal $V_{limit}$ expressed by Eq. (7) is plotted with dashed line in FIG. 4. The hyperbolic curve of FIG. 3 is redrawn in FIG. 4 with real line. For clearly illustration, the curves with value above 0.4 Volts are zoomed out. If the values of $U_i$, $R_i$ and $C_i$ are properly selected, the dashed line could be almost coincide with the real line.

Persons of ordinary skill in the art should know that the ON time $t_{onp}$ of the transistor Q1 is in a range of $t_{onp\_min}$ to $t_{onp\_max}$ in a given system, wherein $t_{onp\_min}$ is a lower limit of the ON time $t_{onp}$, and $t_{onp\_max}$ is a upper limit of the ON time $t_{onp}$. So the constant of the peak value K of the voltage $V_{CS}$ could be achieved by fitting the dashed line to the real line within limits $[t_{onp\_min}, t_{onp\_max}]$ in FIG. 4.

Persons of ordinary skill in the art should know that the peak value K of the voltage $V_{CS}$ could be a varying value or a fixed value. When K is a fixed value, only the DC component $U_0$ of Eq. (6) is needed. A reference signal generator providing the reference signal $V_{limit}$ may be realized by a DC voltage source having a magnitude of $U_0$. When K is a varying value, the DC component $U_0$ and the AC components $$U_i \times \left(1 - e^{-\frac{t_{onp}}{R_i C_i}}\right)$$

are both needed and the reference signal generator providing the reference signal $V_{limit}$ may be realized by several DC voltage sources and several RC circuits comprising $R_i$ and $C_i$.

Figure 5:
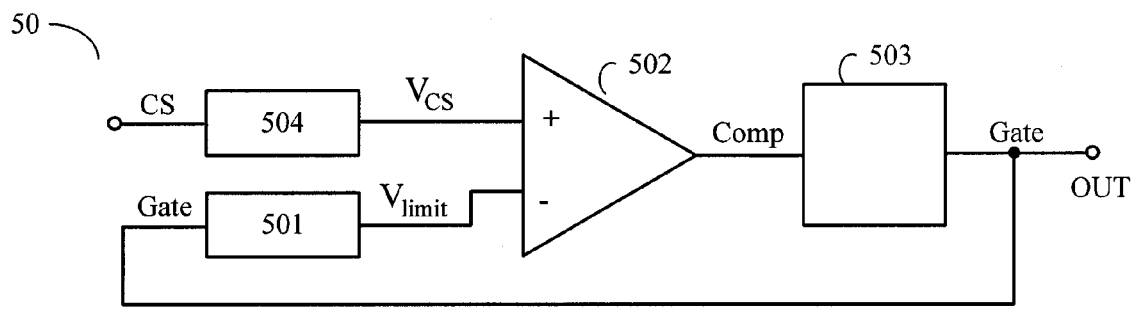
FIG. 5 schematically shows a peak current control circuit 50 in accordance with an embodiment of the disclosure.

FIG. 5 schematically shows a peak current control circuit 50 in accordance with an embodiment of the disclosure. The peak current control circuit 50 comprises: a current sense circuit 504 configured to sense a current flowing through an energy storage component of the power supply, and wherein based on sensing the current flowing through the energy storage component, the current sense circuit 504 generates a current sense signal $V_{CS}$; a reference signal generator 501 having an input terminal and an output terminal, wherein the input terminal is configured to receive a switching control signal Gate, and wherein based on the switching control signal Gate, the reference signal generator generates a reference signal $V_{limit}$ at the output terminal; and a comparator 502 having a first input terminal, a second input terminal and an output terminal, wherein the first input terminal is coupled to the output terminal of the reference signal generator 501 to receive the reference signal $V_{limit}$, the second input terminal is coupled to the current sense circuit 504 to receive the current sense signal $V_{CS}$, and wherein based on the reference signal $V_{limit}$ and the current sense signal $V_{CS}$, the comparator 502 generates a comparison signal Comp at the output terminal. The comparison signal Comp is coupled to a logic circuit 503.

Figure 1A:
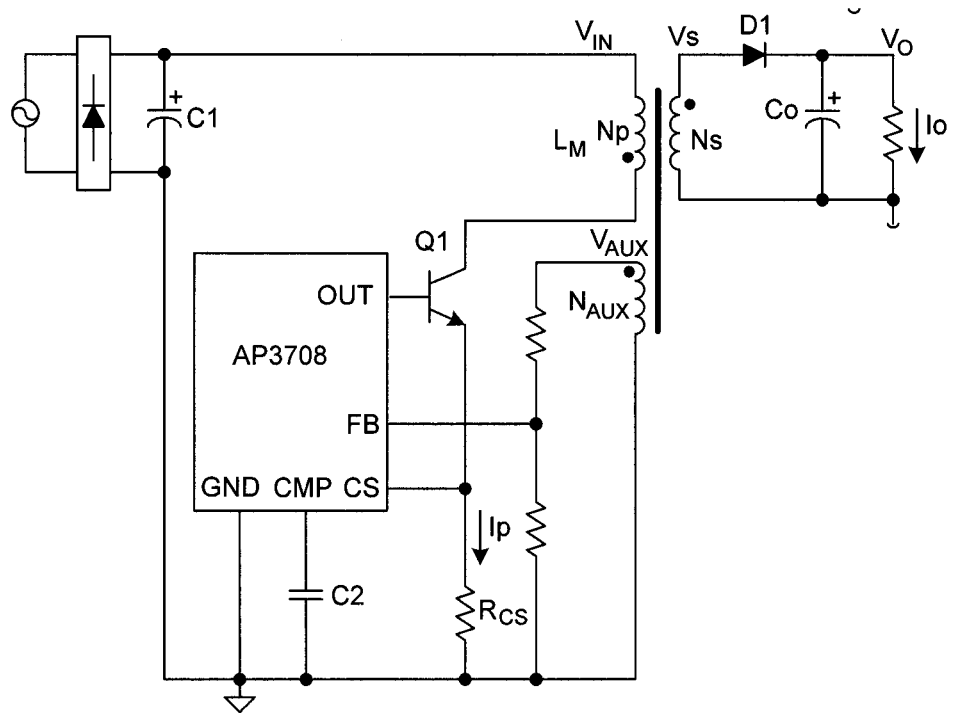
FIG. 1A schematically shows a switching mode power supply with a controller AP3708.
Figure 1B:
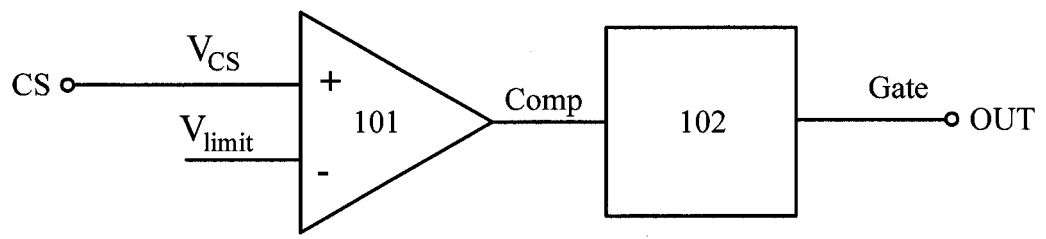
FIG. 1B shows a prior art peak current control circuit which could be applied in the controller AP3708 or other switching mode power supplies.
Figure 2:
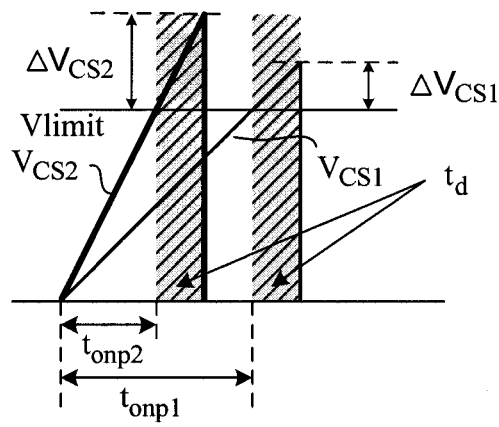
FIG. 2 shows waveforms of the voltage $V_{CS}$ under different conditions.

In one embodiment, the peak current control circuit is applied in a flyback converter, for example, the prior art switching mode power supply in FIG. 1A comprises a flyback converter. At the beginning of a switching cycle, the transistor Q1 is turned ON, the current flowing through the primary wind $N_P$ increases, so does the voltage across the resistor $R_{CS}$. When the current sense signal $V_{CS}$ is larger than the reference signal $V_{limit}$, The comparison signal Comp is logical high. The logic circuit 503 provides a logical low switching control signal Gate to the terminal OUT to turn OFF the transistor Q1. The operation repeats in every cycle.

Persons of ordinary skill in the art should know that the peak current control circuit 50 may be applied in other kinds of switching mode power supply, for example, BUCK converter, BOOST converter, BUCK-BOOST converter, forward converter, and so on. When the peak current control circuit 50 is applied in the BUCK converter, the energy storage component comprises an inductor, and the ON time $t_{onp}$ is corresponding to the time period when a high-side power switch coupled between an input power supply and the inductor is ON. The application of the peak current control circuit in other switching mode power supply is familiar to the persons with ordinary skill in the art.

Persons of ordinary skill in the art should know that the reference signal generator 501 could be applied in any other electric circuits which need a reference signal being an exponential function of a variable.

Figure 6:
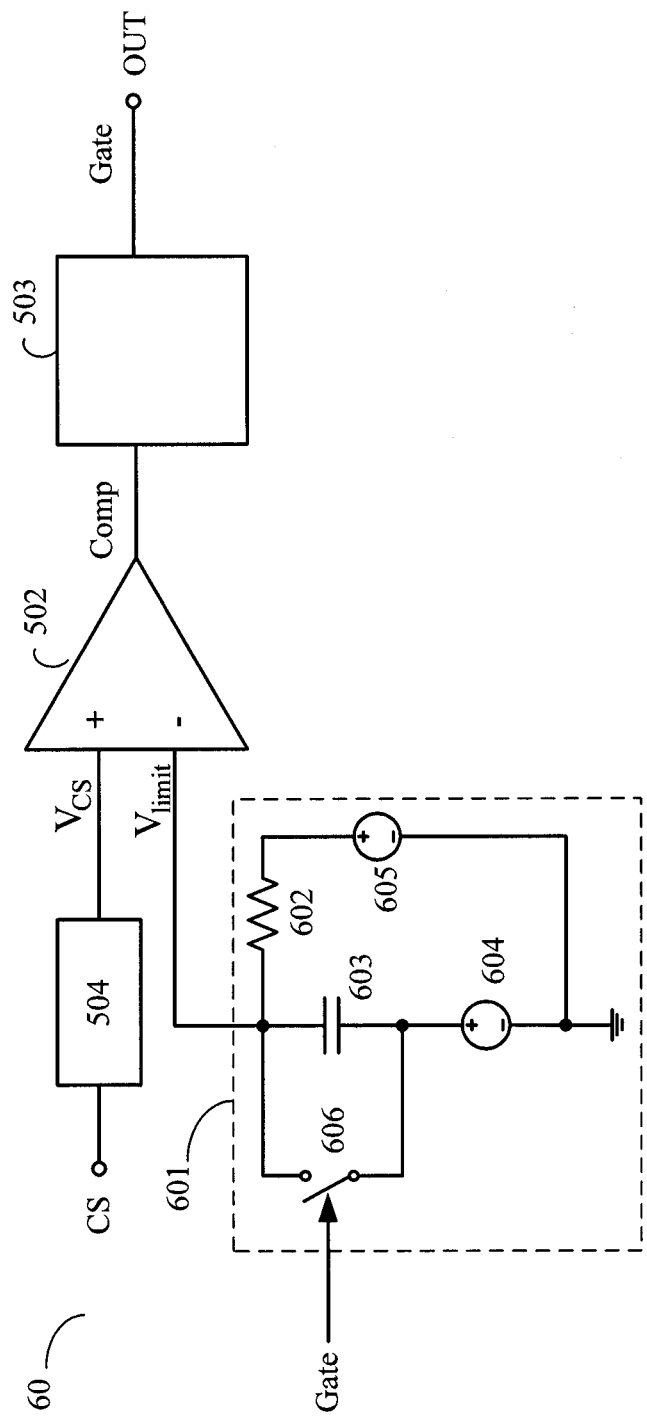
FIG. 6 schematically shows the peak current control circuit 60 with a detailed reference signal generator 601 in accordance with an embodiment of the present disclosure.

FIG. 6 schematically shows the peak current control circuit 60 with a detailed reference signal generator 601 in accordance with an embodiment of the present disclosure. The reference signal generator 601 in FIG. 6 generates a reference signal $V_{limit}$ of Eq. (7). The reference signal generator 601 in FIG. 6 comprises: a first voltage source 604 having a positive terminal and a negative terminal, wherein the negative terminal is coupled to a reference ground; a capacitor 603 having a first terminal and a second terminal, wherein the first terminal is coupled to the positive terminal of the first voltage source 604; a resistor 602 and a second voltage source 605 coupled between the second terminal of the capacitor 603 and the reference ground; and a reset switch 606 coupled across the capacitor 603, wherein the reset switch 606 is controlled by the switching control signal Gate; wherein the reference signal $V_{limit}$ is provided at the second terminal of the capacitor 603.

In one embodiment, the reset switch is ON when the power switch is OFF, and the reset switch is OFF when the power switch is ON.

Persons of ordinary skill in the art should know that: the first voltage source 604 is corresponding to the DC component $U_0$ in Eq. (7); the second voltage source 605, the resistor 602 and the capacitor 603 are respectively corresponding to $U_1$, $R_1$ and $C_1$ of the AC component in Eq. (7).

Figure 7:
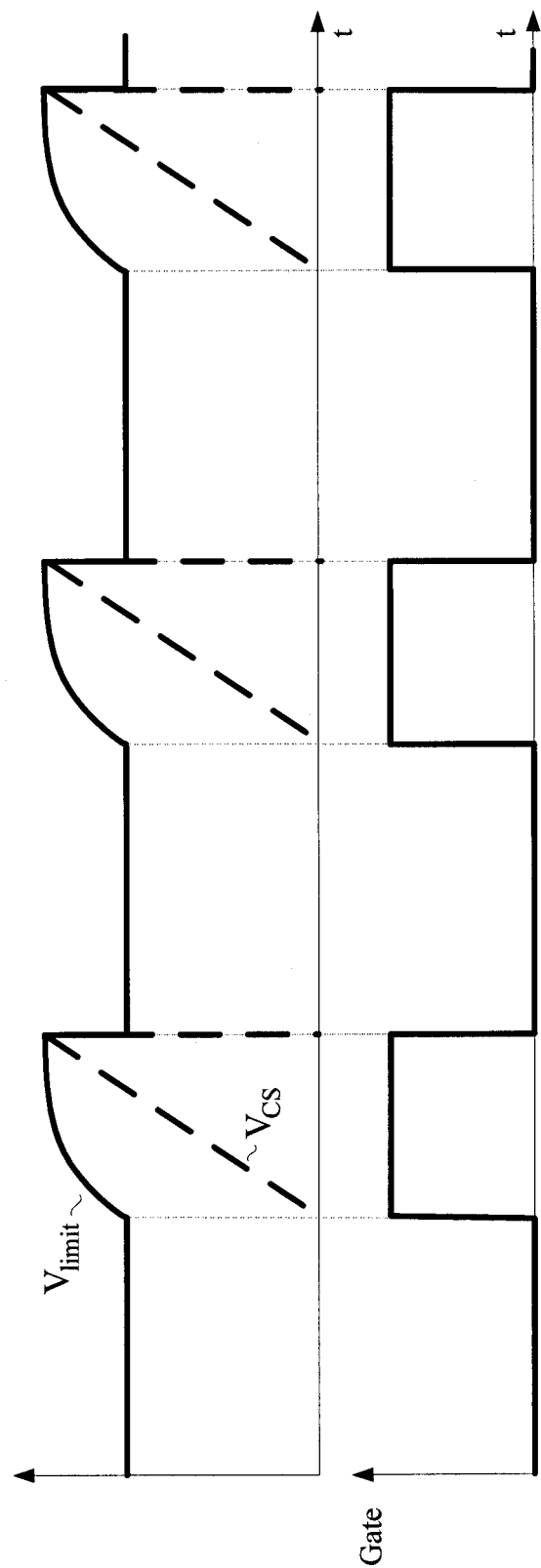
FIG. 7 shows the waveforms of signals in peak current control circuit 60.

In one embodiment, the first voltage source 604 has a magnitude of 0.4 Volts, and the second voltage source 605 has a magnitude of 0.5 Volts. FIG. 7 shows the waveforms of signals in peak current control circuit 60. As shown in FIG. 7, when the reset switch 606 is turned OFF as the transistor Q1 is turned ON, the capacitor 603 is charged, which cause the reference signal $V_{limit}$ to increase. The reference signal $V_{limit}$ has an exponential function curve. When the reset switch 606 is turned ON as the transistor Q1 is turned OFF, the capacitor 603 is discharged. The reference signal $V_{limit}$ is back to 0.4 Volts, which is the magnitude of the first voltage source 604.

Persons of ordinary skill in the art should know that the reset switch 606 in FIG. 6 may comprise a transistor, a MOSFET, an IGBT or other semi-conductance device. The reset switch 606 could be controlled by other signal relative to the switching control signal Gate.

In one embodiment, the peak current limit control circuit is applied in the prior art switching mode power supply in FIG. 1A. The shut down delay $t_d$ is about 150 ns according to the Preliminary Datasheet of AP3708. The peak limit value K is assumed to be 0.5 Volts. The input signal $V_{IN}$ is in the range of 85~265 Volts. The output voltage $V_O$ is 5 Volts, and the output current $I_O$ is 1 Anp. The inductance $L_m$ of the primary winding $N_P$ is in a range of 1~1.5 mH, and the resistance of the current sensing resistor $R_{CS}$ is in a range of 1~1.5 ohm. Applying all the parameter to Eq. (5), and we could have:

$$V_{limit} = \frac{0.5 t_{onp}}{t_{onp} + 116 \times 10^{-9}} \quad (8)$$

Solution for $t_{onp\text{-}min}$:

$$t_{onp\text{-}min} = \frac{K \times L_{m\text{-}min}}{V_{in\text{-}max} \times R_{CS\text{-}max}} = \frac{0.5 \times 1 \times 10^{-3}}{\sqrt{2} \times 265 \times 1.5} = 0.89 \; \mu s \quad (9)$$

Solution for $t_{onp\text{-}max}$:

$$t_{onp\text{-}max} = \frac{K \times L_{m\text{-}max}}{V_{in\text{-}min} \times R_{CS\text{-}min}} = \frac{0.5 \times 1.5 \times 10^{-3}}{\sqrt{2} \times 85 \times 1} = 6.2 \; \mu s \quad (10)$$

From Eqs. (9) and (10), we could conclude that the exponential curve should fit the hyperbolic curve in the range of 0.89~6.2 μs. According to Eq. (7), we may have $R_1$=130 k, $C_1$=10 pF, $U_0$=0.4V, and $U_1$=0.91V.

Figure 8:
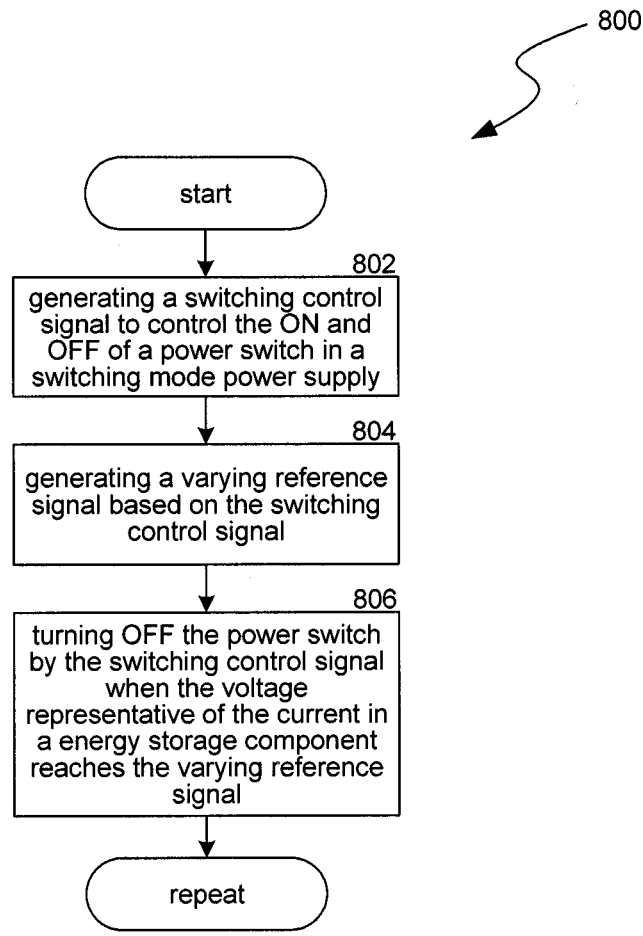
FIG. 8 shows a schematic flowchart 80 of a method of improved peak current control in accordance with an embodiment of the present disclosure.

FIG. 8 shows a schematic flowchart 80 of a method of improved peak current control in accordance with an embodiment of the present disclosure. The method comprises: step 802, generating a switching control signal to control the ON and OFF of a power switch in a switching mode power supply; step 804, generating a varying reference signal according to the switching control signal; and step 806, turning OFF the power switch by the switching control signal when the voltage representative of the current in a energy storage component reaches the varying reference signal.

An effective technique for peak current control method for switching mode power supply has been disclosed. While specific embodiments of the present disclosure have been provided, it is to be understood that these embodiments are for illustration purposes and not limiting. Many additional embodiments will be apparent to persons of ordinary skill in the art reading this disclosure.

We claim:

1. A switching mode power supply, comprising:
   a power switch configured to be turned ON and OFF under the control of a switching control signal;
   an energy storage component configured to store energy when the power switch is turned ON, and to release the stored energy when the power switch is turned OFF;
   a current sense circuit configured to sense a current flowing through the energy storage component, and wherein based on sensing the current flowing through the energy storage component, the current sense circuit generates a current sense signal;
   a reference signal generator having an input terminal and an output terminal, wherein the input terminal is configured to receive the switching control signal, and wherein based on the switching control signal, the reference signal generator generates a reference signal at the output terminal,
   wherein the relationship between the reference signal ($V_{limit}$) and an ON time ($t_{onp}$) is expressed as an equation:

$$V_{limit} = \frac{K \times t_{onp}}{t_{onp} + t_d}$$

wherein in the equation, the ON time ($t_{onp}$) is defined as the time period when the power switch of the power supply is ON, and K is a predetermined value, and $t_d$ is a shut down delay of the switching control signal; and
   a comparator having a first input terminal, a second input terminal and an output terminal, wherein the first input terminal is coupled to the output terminal of the reference signal generator to receive the reference signal, the second input terminal is coupled to the current sense circuit to receive the current sense signal, and wherein based on the reference signal and the current sense signal, the comparator generates a comparison signal at the output terminal.

2. The switching mode power supply of claim 1, wherein the reference signal generator comprises:
   a first voltage source having a positive terminal and a negative terminal, wherein the negative terminal is coupled to a reference ground;
   a capacitor having a first terminal and a second terminal, wherein the first terminal is coupled to the positive terminal of the first voltage source;
   a resistor and a second voltage source coupled between the second terminal of the capacitor and the reference ground; and
   a reset switch coupled across the capacitor, wherein the reset switch is controlled by the switching control signal; wherein
   the reference signal is provided at the second terminal of the capacitor.

3. The switching mode power supply of claim 2, wherein the reset switch is ON when the power switch is OFF, and the reset switch is OFF when the power switch is ON.

4. The switching mode power supply of claim 1, wherein the equation is approximately represented by an exponential function:

$$V_{limit} = \frac{K \times t_{onp}}{t_{onp} + t_d} \approx$$

$$U_0 + U_1 \times \left(1 - e^{\frac{t_{onp}}{R_1 C_1}}\right) + U_2 \times \left(1 - e^{\frac{t_{onp}}{R_2 C_2}}\right) + \ldots + U_n \times \left(1 - e^{\frac{t_{onp}}{R_n C_n}}\right)$$

wherein $U_i$ is the magnitude of a voltage source, $R_j$ is a resistance value and $C_j$ is a capacitance value, and wherein $0 \le i \le n$, $1 \le j \le n$, and n is a natural number.

5. The switching mode power supply of claim 4, wherein the reference signal generator comprises a RC circuit, and (m+1) voltage sources to perform the function of the exponential function, and wherein the RC circuit comprises m resistors and m capacitors, and wherein m is a natural number.

6. The switching mode power supply of claim 5, wherein K is a constant value, and m=0.

7. The switching mode power supply of claim 5, wherein K is a time-varying value, and m>0.

8. The switching mode power supply of claim 1, wherein the equation is approximately represented by a second exponential function:

$$V_{limit} = \frac{K \times t_{onp}}{t_{onp} + t_d} \approx U_0 + U_1 \times \left(1 + e^{\frac{t_{onp}}{R_1 C_1}}\right)$$

wherein $U_i$ is the magnitude of a voltage source, $R_1$ is a resistance value and $C_1$ is a capacitance value, and i=0 or i=1.

9. A method of generating a reference signal in a switching mode power supply, the method comprising:
generating a switching control signal to control the ON and OFF of a power switch in the switching mode power supply;
generating a varying reference signal in accordance with an equation:

$$V_{limit} = \frac{K \times t_{onp}}{t_{onp} + t_d}$$

wherein $t_{onp}$ is the ON time which is defined as the time period when a power switch of the power supply is turned ON, K is a predetermined value and $t_d$ is the shut down delay of the switching control signal; and
turning OFF the power switch by the switching control signal when the voltage indicative of the current in an energy storage component reaches the varying reference signal.

10. The method of claim 9, wherein the second equation is approximately represented by a third exponential function:

$$V_{limit} = \frac{K \times t_{onp}}{t_{onp} + t_d} \approx$$
$$U_0 + U_1 \times \left(1 - e^{\frac{t_{onp}}{R_1 C_1}}\right) + U_2 \times \left(1 - e^{\frac{t_{onp}}{R_2 C_2}}\right) + \ldots + U_n \times \left(1 - e^{\frac{t_{onp}}{R_n C_n}}\right)$$

wherein $U_i$ is the magnitude of a voltage source, $R_j$ is the resistance value and $C_j$ is the capacitance value, and wherein 0≤i≤n, 1≤j≤n, n is a natural number.

11. The method of claim 10, wherein generating a varying reference signal comprises configuring a RC circuit and (m+1) voltage sources to perform the function of the third equation, and wherein the RC circuit comprises m resistors and m capacitors, m is a natural number.

12. The method of claim 11, wherein K is a constant value, and m=0.

13. The method of claim 11, wherein K is a time-varying value, and m>0.

14. The method of claim 9, wherein the second equation is approximately represented by a fourth exponential function:

$$V_{limit} = \frac{K \times t_{onp}}{t_{onp} + t_d} \approx U_0 + U_1 \times \left(1 - e^{\frac{t_{onp}}{R_1 C_1}}\right)$$

wherein $U_i$ is the magnitude of a voltage source, $R_1$ is a resistance value and $C_1$ is a capacitance value, and i=0 or i=1.

15. The method of claim 9, wherein generating a varying reference signal comprises:
biasing a voltage across a capacitor;
charging the capacitor by a RC circuit when the power switch is ON; and
reset the voltage across the capacitor to be the bias voltage when the power switch is turned OFF; wherein the voltage across the capacitor is the varying reference signal.

16. A switching mode power supply, comprising:
a transformer having a primary winding and a secondary winding, wherein the primary winding has a first terminal and a second terminal, wherein the first terminal is configured to receive an input voltage, and the secondary winding is configured to supply power to a load;
a power switch coupled to the second terminal of the primary winding to control a current flowing through the primary winding, wherein the power switch is controlled by a switching control signal;
a current sense circuit configured to sense the current flowing through the primary winding to generate a current sense signal;
a reference signal generator configured to receive the switching control signal to generate a reference signal based on thereupon, wherein the reference signal generator comprises:
a first voltage source having a positive terminal and a negative terminal, wherein the negative terminal is coupled to a reference ground;
a capacitor having a first terminal and a second terminal, wherein the first terminal is coupled to the positive terminal of the first voltage source;
a resistor and a second voltage source coupled between the second terminal of the capacitor and the reference ground;
a reset switch coupled across the capacitor, wherein the reset switch is controlled by the switching control signal; wherein
the reference signal is provided at the second terminal of the capacitor;
a comparator having a first input terminal, a second input terminal and an output terminal, wherein the first input terminal is coupled to the output terminal of the reference signal generator to receive the reference signal, the second input terminal is coupled to the current sense circuit to receive the current sense signal, and wherein based on the reference signal and the current sense signal, the comparator generates a comparison signal at the output terminal; and
a logic circuit coupled to the output terminal of the comparator to receive the comparison signal, and based on the comparison signal, the logic circuit generates the switching control signal.

17. The switching mode power supply of claim 16, wherein the reset switch is ON when the power switch is OFF, and the reset switch is OFF when the power switch is ON.

* * * * *